(12) United States Patent
Shimizu et al.

(10) Patent No.: US 7,507,013 B2
(45) Date of Patent: Mar. 24, 2009

(54) SURFACE LIGHT SOURCE UNIT WITH BUFFERING MEANS, AND LIQUID CRYSTAL DISPLAY WITH THE UNIT

(75) Inventors: Makoto Shimizu, Kanazawa (JP); Toshihiko Ura, Nomi (JP); Yoshinori Yasuda, Ishikawa-gun (JP); Hiromi Kaneda, Hakusan (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 208 days.

(21) Appl. No.: 11/414,375

(22) Filed: May 1, 2006

(65) Prior Publication Data

US 2006/0256583 A1 Nov. 16, 2006

(30) Foreign Application Priority Data

May 13, 2005 (JP) ............................. 2005-141057

(51) Int. Cl.
*F21V 7/10* (2006.01)
(52) U.S. Cl. .................. 362/633; 362/581; 362/628; 362/632; 362/634
(58) Field of Classification Search ............... 362/633, 362/581, 628, 632, 634; 349/58.6
See application file for complete search history.

(56) References Cited

U.S. PATENT DOCUMENTS

| | | | | |
|---|---|---|---|---|
| 5,280,372 A | * | 1/1994 | Horiuchi | ...................... 349/58 |
| 5,788,356 A | * | 8/1998 | Watai et al. | .................. 362/621 |
| 6,386,722 B2 | * | 5/2002 | Okumura | ..................... 362/633 |
| 6,419,369 B1 | * | 7/2002 | Itoh | ............................ 362/26 |
| 6,811,276 B2 | * | 11/2004 | Moon | .......................... 362/600 |
| 2005/0018415 A1 | * | 1/2005 | Shimizu et al. | ............. 362/633 |
| 2005/0276076 A1 | * | 12/2005 | Shin | ........................... 362/633 |
| 2006/0139961 A1 | * | 6/2006 | Yu et al. | ...................... 362/632 |
| 2007/0053207 A1 | * | 3/2007 | Kokogawa | ................... 362/633 |
| 2007/0076436 A1 | * | 4/2007 | Ma et al. | ..................... 362/634 |
| 2007/0211495 A1 | * | 9/2007 | Chen et al. | ................... 362/633 |

FOREIGN PATENT DOCUMENTS

JP 2001-4983 1/2001

* cited by examiner

*Primary Examiner*—Ismael Negron
(74) *Attorney, Agent, or Firm*—Oblon, Spivak, McClelland, Maier & Neustadt, P.C.

(57) ABSTRACT

A surface light source unit includes a cold-cathode fluorescent tube, a light guide which receives light from the cold-cathode fluorescent tube and outputs the light, a back frame supporting the cold-cathode fluorescent tube and the light guide and including a projection used to position the light guide and the cold-cathode fluorescent tube, and a lamp holder including a holding portion which holds an end of the cold-cathode fluorescent tube, and a buffering portion provided between the projection and the cold-cathode fluorescent tube.

2 Claims, 3 Drawing Sheets

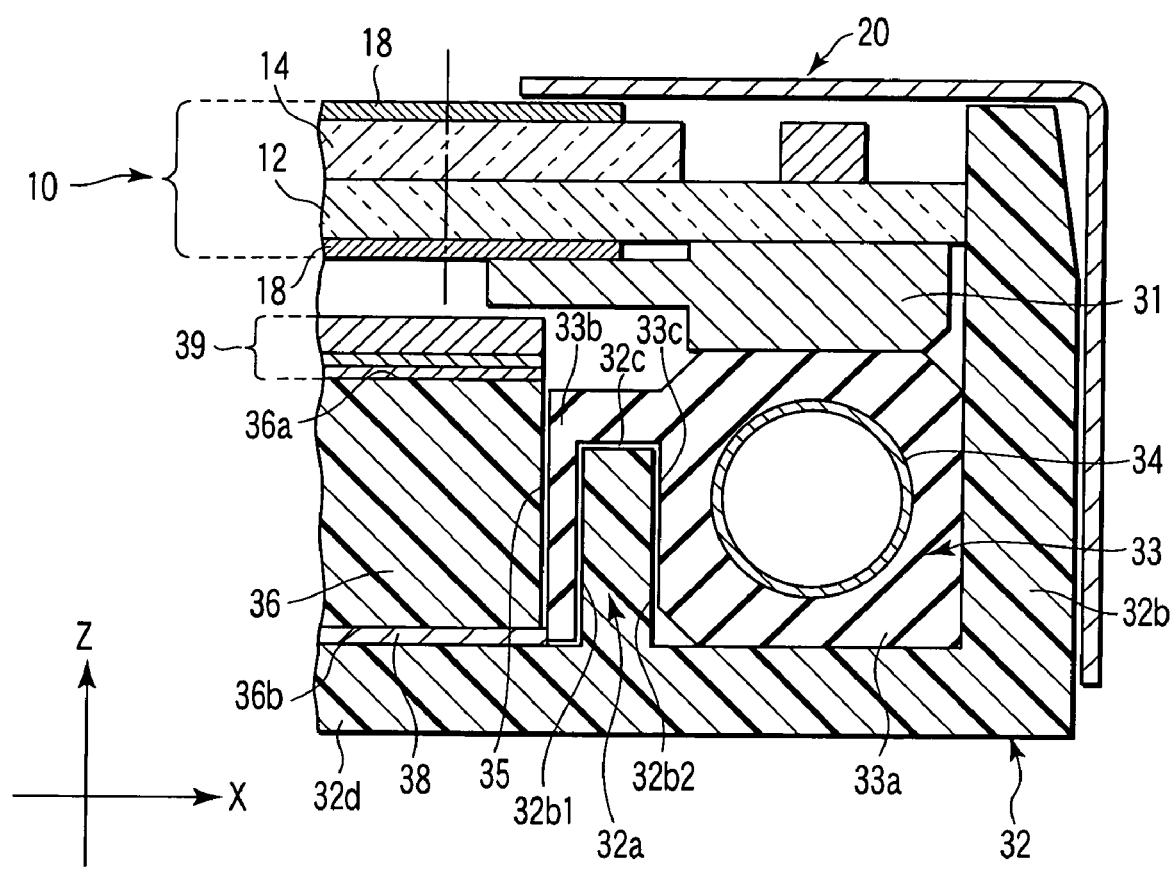
F I G. 3

SURFACE LIGHT SOURCE UNIT WITH BUFFERING MEANS, AND LIQUID CRYSTAL DISPLAY WITH THE UNIT

CROSS-REFERENCE TO RELATED APPLICATIONS

This application is based upon and claims the benefit of priority from prior Japanese Patent Application No. 2005-141057, filed May 13, 2005, the entire contents of which are incorporated herein by reference.

BACKGROUND OF THE INVENTION

1. Field of the Invention

The present invention relates to a surface light source unit with a light guide, and a liquid crystal display device with the surface light source unit.

2. Description of the Related Art

In general, liquid crystal display devices comprise a liquid crystal display panel for displaying an input image, and a surface light source unit for illuminating the panel from behind. The display liquid display panel is supported by the back frame of the surface light source, and has its periphery covered with a cover.

The surface light source unit includes a light source for emitting light, and a light guide for guiding the light emitted from the light source. The light guide and light source are supported by the back frame, and the light source is provided around the light guide. The back frame includes a projection projecting between the light source and light guide to position them. The back frame is formed of, for example, a polycarbonate resin, and the light guide is formed of an acrylic resin.

In the prior art, when an external force is applied to the liquid crystal display device, thereby causing the surface light source unit to, for example, be twisted, the light guide may contact the back frame, thereby generating noise.

To suppress the noise caused when such members as the liquid crystal panel and frame contact each other, a method for imparting an inclined surface to the inner wall of the frame has been proposed (see, for example, Jpn. Pat. Appln. KOKAI Publication No. 2001-4983).

However, even if such an inclined surface is provided, the projection of the back frame for positioning the light guide may well be brought into contact with the light guide, thereby inevitably generating noise.

BRIEF SUMMARY OF THE INVENTION

The present invention has been developed in view of the above problem, and aims to provide a surface light source unit, in which a light guide is prevented from contacting the projections of a back frame, and hence which is free from noise due to such contact. The present invention also provides a liquid crystal display device with the surface light source unit.

In accordance with an aspect of the invention, there is provided a surface light source unit comprising: a light source; a light guide which receives light from the light source and outputs the light; a frame supporting the light source and the light guide and including a projection used to position the light source and the light guide; and a holder including a holding portion which holds an end of the light source, and a buffering portion provided between the projection and the light guide.

In accordance with another aspect of the invention, there is provided a liquid crystal display device comprising: a liquid crystal display panel provided with an display section including a plurality of display pixels; and a surface light source unit. The surface light source unit comprises: a light source; a light guide which receives light from the light source and outputs the light; a frame supporting the light source and the light guide and including a projection used to position the light source and the light guide; and a holder including a holding portion which holds an end of the light source, and a buffering portion provided between the projection and the light guide.

The present invention can provide a surface light source unit, in which a light guide is prevented from contacting the projections of a back frame, and hence which is free from noise due to such contact. The present invention also can provide a liquid crystal display device with the surface light source unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a sectional view taken along line III-III of FIG. 2B.

DETAILED DESCRIPTION OF THE INVENTION

Referring to the accompanying drawings, a description will be given of a surface light source unit according to an embodiment of the invention, and a liquid crystal display device provided with the surface light source unit.

Figure 1:
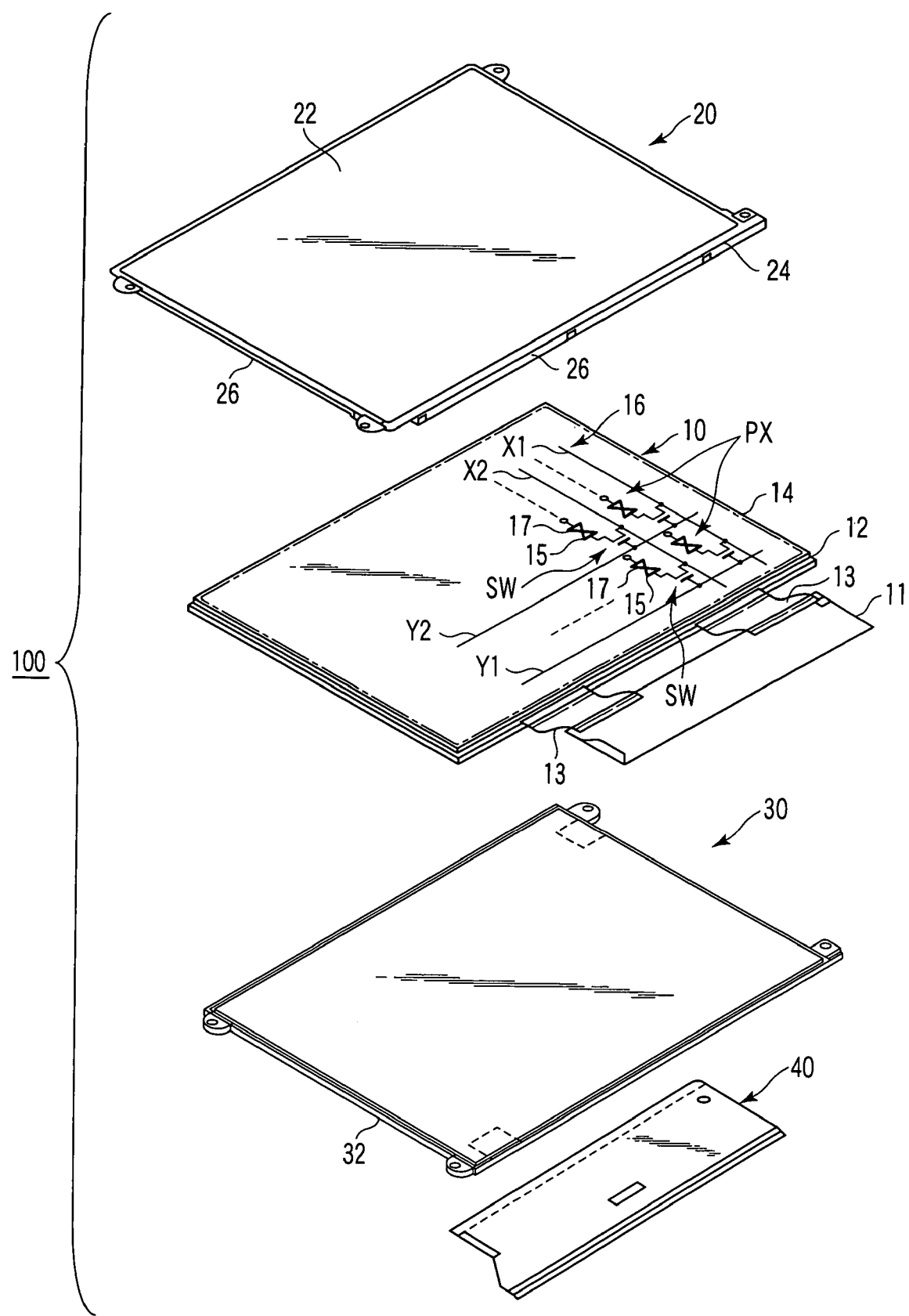
FIG. 1 is a schematic exploded view illustrating a liquid crystal display device provided with a surface light source unit according to an embodiment of the invention.

As shown in FIG. 1, a liquid crystal display device 100 comprises a rectangular liquid crystal display panel 10, a backlight 30 as a surface light source unit for illuminating the panel 10 from behind, and a cover 20 attached to a back frame 32, incorporated in the backlight 30, for holding the periphery of the liquid crystal display device. The backlight 30 is attached to the reverse side of the panel 10. The rectangular-frame-shaped cover 20 is attached to the obverse side of the panel 10.

As shown in FIGS. 1 and 3, the liquid crystal display panel 10 includes an array substrate 12 and a counter substrate 14. A liquid crystal layer is interposed between the substrates 12 and 14. Respective polarizing plates 18 are fixed on the outer surfaces of the array substrate 12 and the counter substrate 14. The liquid crystal display panel 10 has a rectangular display section 16 corresponding to a display area for displaying images.

The display section 16 is formed of a plurality of display pixels PX arranged in a matrix. The display pixels PX are connected to a plurality of scanning lines Y (1, 2, 3, ...) extending in the row direction of the matrix, and a plurality of signal lines X (1, 2, 3, ...) extending in the column direction of the matrix.

Each display pixel PX has a pixel switch SW realized by, for example, a thin-film transistor (TFT). The gate electrode of the pixel switch SW is electrically connected to a corresponding one of the scanning lines Y, the source electrode of the same is electrically connected to a corresponding one of the signal lines X, and the drain electrode of the same is electrically connected to the pixel electrode 15 of a corresponding one of the display pixels PX. The counter substrate 14 has counter electrodes 17 opposing the plurality of pixel electrodes 15 in the display section 16.

A driver circuit 11 formed of a rectangular flat plate and used to output driving signals to the liquid crystal display panel 10 is electrically connected to one side of the panel 10 via a pair of thin, flexible printed circuit boards 13 having a rectangular, substantially flat shape. The driver circuit 11 is positioned on the reverse side of the backlight 30 by bending the printed circuit boards 13 toward the reverse side of the backlight 30. At this time, a thin, rectangular insulation sheet 40 is interposed between the driver circuit 11 and backlight 30 to reliably electrically isolate the driver circuit 11 and backlight 30 from each other.

The cover 20 has a rectangular window 22 for exposing the display section 16 of the liquid crystal display panel 10, and a rectangular main frame section 24 defining the window 22. The main frame section 24 includes an outer periphery section 26 for covering the periphery of the panel 10 when the panel 10 is fitted in the frame.

The backlight 30 is substantially rectangular, and opposes the reverse side of the liquid crystal display panel 10 so that it illuminates the panel 10 from behind.

The backlight 30 comprises a cold-cathode fluorescent tube 34 as a light source, a light guide 36 for guiding, to the liquid crystal display panel 10, the light emitted from the tube 34, a back frame 32 supporting the tube 34 and light guide 36, and optical sheets 38 and 39 provided on the obverse and reverse sides of the light guide 36, respectively.

The back frame 32 includes a substantially rectangular support section 32d supporting the cold-cathode fluorescent tube 34 and the light guide 36, a frame section 32b opposing the side surfaces of the liquid crystal display panel 10 and the side surfaces of the cold-cathode fluorescent tube 34, and projections 32a positioning the cold-cathode fluorescent tube 34 and light guide 36.

The light guide 36 is substantially rectangular, and includes a first major surface (observe side) 36a, a second major surface (reverse side) 36b opposing the first one, and four side surfaces 36s extending between the first and second major surfaces 36a and 36b. The light guide 36 is fitted in the back frame 32, with the second major surface 36b opposed to the support section 32d. The light guide 36 is positioned in the back frame 32 by bringing intersecting two side surfaces of the guide kept into contact with the frame section 32b of the back frame 32, and engaging the other two side surfaces of the guide with the respective projections 32a of the back frame 32. The other two side surfaces 36s of the light guide 36 oppose the frame section 32b with a gap interposed therebetween, and the cold-cathode fluorescent tube 34, described later, is provided in the gap. The other two side surfaces 36s of the light guide 36, close to the tube 34, extend substantially parallel to the axis of the tube 34, and the first major surface 36a opposes the reverse surface of the crystal liquid display panel 10.

Namely, the side surfaces 36s opposing the cold-cathode fluorescent tube 34 serve as planes of input that the light from the cold-cathode fluorescent tube 34 enters, and the first major surface 36a serves as a plane of output that outputs the input light to the liquid crystal display panel 10.

The optical sheet 38 provided on the reverse side of the light guide 36 imparts a predetermined optical characteristic to the light leaking from the reverse surface and side surfaces of the light guide 36. That is, the optical sheet 38 is a reflection sheet for reflecting, to the light guide 36, the light leaked from the reverse surface and side surfaces of the light guide 36 to the outside. Similarly, the optical sheet 39 provided on the obverse side of the light guide 36 imparts a predetermined optical characteristic to the light output from the obverse side. For instance, the optical sheet 39 is a light converging sheet for converging light, or a light diffusion sheet for diffusing light, etc.

Figure 2A:
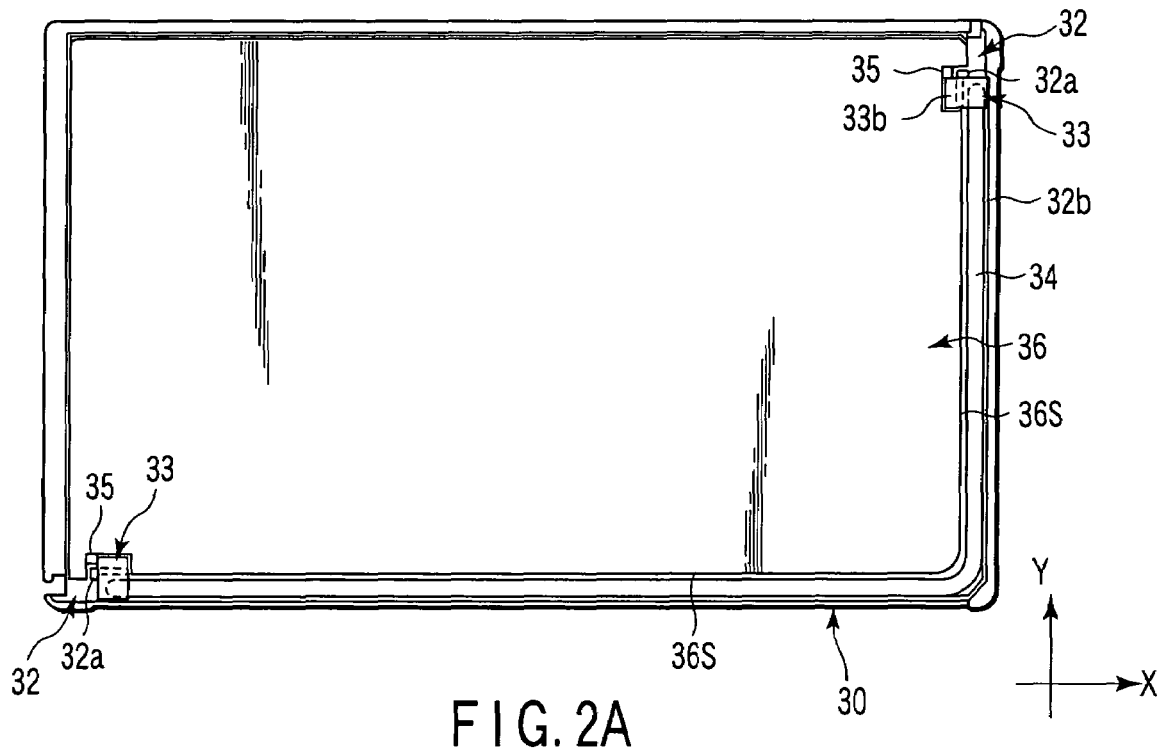
FIG. 2A is a front view illustrating the surface light source unit of the liquid crystal display device shown in FIG. 1.
Figure 2B:
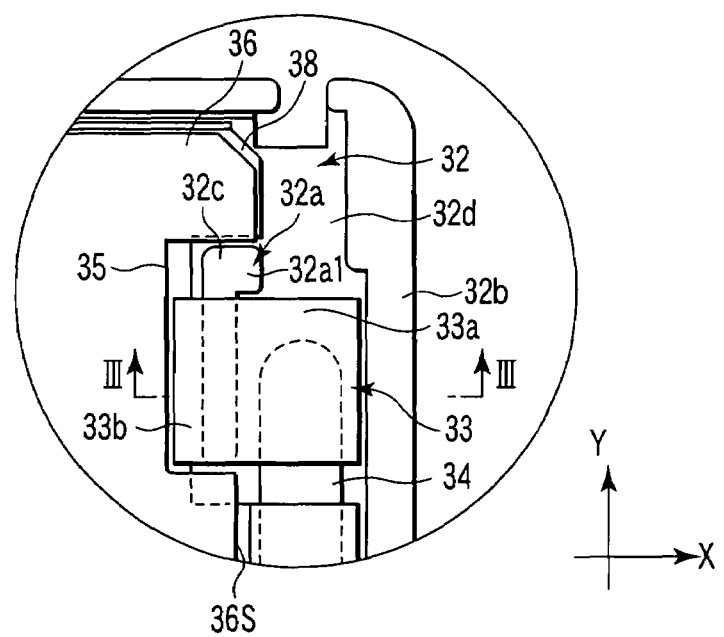
FIG. 2B is an enlarged view illustrating an end portion of a cold-cathode fluorescent tube incorporated in the surface light source unit shown in FIG. 2A.

As shown in FIGS. 2A, 2B and 3, the cold-cathode fluorescent tube 34 has a substantially L-shape, and extends along the frame section 32b at the right-hand side of the back frame 32 and below the frame 32. The tube 34 is a slim cylindrical light source. The side surface of the tube 34 that does not oppose the side surfaces 36s of the light guide 36, and the upper surface of the tube 34 are covered with those lower and right-hand portions (in FIG. 2A) of the optical sheet 38 which are folded back around the tube 34.

To enable the structure of the backlight 30 to be understood easily, FIGS. 2A and 2B show the state in which the optical sheet 39 and a front frame 31 are removed.

Lamp holders 33 are attached to the opposite ends of the cold-cathode fluorescent tube 34. Each lamp holder 33 includes a holding portion 33a that holds an end of the cold-cathode fluorescent tube 34. The projections 32a of the back frame 32 are located between the opposite ends of the tube 34 and the light guide 36. Each projection 32a includes side surfaces 32b1 and 32b2 extending from the support section 32d of the back frame 32 in the thickness direction of the liquid crystal display device (i.e., in the Z direction), and an upper surface 32c extending between the side surfaces 32b1 and 32b2 substantially parallel to the support section 32d (i.e., in the X direction). Each projection 32a also includes a convex portion 32a1 that limits the position of the tube 34 in the corresponding one of the axial directions thereof. The convex portion 32a1 extends from the side surface 32b2 in the X-direction. The side surfaces 36s of the light guide 36, which oppose the upper right portion and lower left portion of the tube 34 in FIG. 2A, have recesses 35 that receive the respective projections 32a. The side surfaces 32b1 of the projections 32a oppose the respective recesses 35. A buffering portion 33b incorporated in each lamp holder 33 is provided between the corresponding recess 35 and the side surface 32b1 of the corresponding projection 32a. The holding portion 33a and buffering portion 33b are formed as a single body, using an elastic material such as rubber.

The buffering portion 33b extends from a surface 33c included in the holding portion 33a and opposing the side surface 32b2 of each projection 32a. Each projection 32a is located between the corresponding holding portion 33a and buffering portion 33b. Namely, the buffering portion 33b extends along the upper surface 32c of each projection 32a and the side surface 32b1 of the same opposing the recess 35. The side surface 32b1 and upper surface 32c of each projection 32a oppose the buffering portion 33b of the corresponding holder 33, while the side surface 32b2 of each projection 32a opposes the surface 33c of the corresponding holder 33. Accordingly, each projection 32a is held between the holding portion 33a and buffering portion 33b of the corresponding lamp holder 33. Namely, the cold-cathode fluorescent tube 34 has its movements, perpendicular to its axes, limited by the projections 32a and frame section 32b. Further, the axial movements of the cold-cathode fluorescent tube 34 are limited by the convex portions 32a1 of the projections 32a. Thus, the cold-cathode fluorescent tube 34 is positioned with respect to the back frame 32 by the projections 32a and frame section 32b.

As described above, each lamp holder 33 has the elastic buffering portion 33b. Since the respective buffering portions 33b are located between the light guide 36 and the projections 32a, the projections 32a of the back frame 32 and the light guide 36 are prevented from being brought into contact with each other. When the buffering portion 33b is brought into contact with the light guide 36, the impact of contact is absorbed by the elastic buffering portion 33b and hence no significant noise occurs. Similarly, when the buffering portion 33b is brought into contact with the projections 32a, the impact of contact is absorbed by the elastic buffering portion 33b, and hence no significant noise occurs. Accordingly, even if the light guide 36 and projections 32a are formed of hard materials, the liquid crystal display device of the embodiment is free from a significant noise problem.

Further, in the liquid crystal display device of the embodiment, the holding portion 33a and buffering portion 33b of each lamp holder 33 are formed as a single body, and the projections 32a of the back frame 32 extend from the support section 32d in the thickness direction (Z-direction) of the device. This structure enables the lamp holders 33 to be easily attached to the back frame 32 from the obverse side of the liquid crystal display device, so that the holding portion 33a and buffering portion 33b hold the projections 32a. Thus, the buffering portions 33b can be easily interposed between the projections 32a and the light guide 36.

Namely, the present invention can provide a surface light source unit, in which the light guide and back frame are prevented from contacting each other without any additional component, and hence which is free from noise due to such contact. It can also provide a liquid crystal display device with the surface light source unit.

Although in the embodiment described, each projection 32a of the back frame 32 is provided only between the corresponding lamp holder 33 and light guide 36, it may oppose the whole portion of each side surface of the light guide 36, like the frame section 32b of the back frame 32.

Furthermore, although in the embodiment described, the projections 32a are provided at the support section 32d of the back frame 32, they may be provided at the frame section 32b. Also in these cases, the arrangement of the buffering portions 33b between the projections 32a and light guide 36 enables the same advantage as the first embodiment to be acquired.

In addition, although in the embodiment described, a substantially L-shaped cold-cathode fluorescent tube 34 is used as a light source, the invention is also applicable to the case of using a substantially linear cold-cathode fluorescent tube. In this case, it is desirable that the light guide 36 should have, instead of the substantially flat shape, a wedge shape having a thickness gradually reduced from the side surface that the light from the cold-cathode fluorescent tube enters, to the opposite side surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A surface light source unit comprising:
   a light source;
   a light guide which receives light from the light source and outputs the light;
   a frame supporting the light source and the light guide and including a projection used to position the light source and the light guide;
   a holder including a holding portion which holds an end of the light source, and a buffering portion provided between the projection and the light guide,
   wherein:
   the holding portion and the buffering portion are formed of an elastic material integrally as one body and
   the projection includes a convex portion which limits position of the light source in a direction of an axis of the light source.

2. A surface light source unit comprising:
   a light source;
   a light guide which receives light from the light source and outputs the light;
   a frame supporting the light source and the light guide and including a projection used to position the light source and the light guide;
   a holder including a holding portion which holds an end of the light source, and a buffering portion provided between the projection and the light guide,
   wherein:
   the holding portion and the buffering portion are formed of an elastic material integrally as one body;
   the light guide includes a first major surface which outputs light, a second major surface located in an opposite side of the first major surface and opposing the frame, and a side surface extending between the first major surface and the second major surface, the projection opposes the side surface, and the buffering portion is interposed between the side surface and the projection; and
   the light guide includes a recess formed in the side surface and receiving the projection, and the buffering portion is interposed between the recess and the projection.

* * * * *